United States Patent
Wetzel et al.

(10) Patent No.: US 10,451,039 B2
(45) Date of Patent: Oct. 22, 2019

(54) SYSTEM AND METHOD FOR REDUCING WIND TURBINE NOISE DURING HIGH WIND SPEED CONDITIONS

(71) Applicant: General Electric Company, Schenectady, NY (US)

(72) Inventors: Drew Adam Wetzel, Easley, SC (US); Benjamin Hallissy, Greenville, SC (US); Robert Ehrmann, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/618,180

(22) Filed: Jun. 9, 2017

(65) Prior Publication Data

US 2018/0355849 A1    Dec. 13, 2018

(51) Int. Cl.
*F03D 7/02* (2006.01)
*G05B 19/402* (2006.01)

(52) U.S. Cl.
CPC ......... *F03D 7/0296* (2013.01); *F03D 7/0204* (2013.01); *G05B 19/402* (2013.01); *F05B 2260/96* (2013.01); *F05B 2270/32* (2013.01); *F05B 2270/321* (2013.01); *F05B 2270/328* (2013.01); *F05B 2270/329* (2013.01); *F05B 2270/333* (2013.01); *F05B 2270/708* (2013.01);
(Continued)

(58) Field of Classification Search
CPC ... F03D 7/0296; F03D 7/0204; G05B 19/402; G05B 2219/2619; F05B 2260/96
See application file for complete search history.

(56) References Cited

U.S. PATENT DOCUMENTS

| 7,387,491 B2 | 6/2008 | Saddoughi et al. |
| 7,476,985 B2 | 1/2009 | Llorente Gonzalez |
| 7,883,317 B2 | 2/2011 | Ormel et al. |

(Continued)

FOREIGN PATENT DOCUMENTS

| EP | 2489872 B1 | 3/2013 |
| EP | 2 762 721 A2 | 8/2014 |

(Continued)

OTHER PUBLICATIONS

Ignacio Romero-Sanz and Álvaro Matesanz, "Noise Management on Modern Wind Turbines", Wind Engineering vol. 32, No. 1, 2008 pp. 27-44 (Year: 2008).*

(Continued)

*Primary Examiner* — Thomas C Lee
*Assistant Examiner* — Michael Tang
(74) *Attorney, Agent, or Firm* — Dority & Manning, P.A.

(57) ABSTRACT

A method for reducing noise of a wind turbine includes monitoring, via one or more sensors, a wind speed at the wind turbine. The method also includes determining, via a turbine controller, a nominal wind direction for producing rated power of the wind turbine. Further, the method includes determining a pitch angle of at least one rotor blade of the wind turbine. As such, the method includes determining a yaw offset for a nacelle of the wind turbine based on the wind speed and/or the pitch angle. Thus, the method further includes changing a yaw angle of the nacelle by the yaw offset when the wind speed exceeds a predetermined threshold so as to reduce noise of the wind turbine.

20 Claims, 8 Drawing Sheets

(52) U.S. Cl.
CPC . *F05B 2270/807* (2013.01); *F05B 2270/8042* (2013.01); *G05B 2219/2619* (2013.01)

(56) References Cited

U.S. PATENT DOCUMENTS

| | | | |
|---|---|---|---|
| 8,018,081 | B2 | 9/2011 | Calley |
| 8,427,333 | B2 | 4/2013 | Kraemer |
| 9,562,515 | B2 | 2/2017 | Honhoff et al. |
| 9,611,837 | B2 | 4/2017 | Abolfazlian et al. |
| 2007/0035135 | A1* | 2/2007 | Yoshida ............... F03D 7/0284 290/44 |
| 2009/0232635 | A1 | 9/2009 | Menke |
| 2011/0142619 | A1* | 6/2011 | Subramanian ........ F03D 7/048 416/1 |
| 2013/0187383 | A1 | 7/2013 | Esbensen et al. |
| 2014/0193257 | A1 | 7/2014 | Ormel et al. |
| 2014/0219795 | A1* | 8/2014 | Honhoff ............... F03D 7/0204 416/1 |
| 2014/0241878 | A1 | 8/2014 | Herrig et al. |
| 2014/0241882 | A1* | 8/2014 | Caruso ............... F03D 7/0268 416/17 |
| 2014/0369845 | A1 | 12/2014 | Ruijter |
| 2016/0146195 | A1 | 5/2016 | Holtom |
| 2016/0153425 | A1* | 6/2016 | Torbohm ............... F03D 7/043 416/1 |
| 2016/0222944 | A1 | 8/2016 | Stoltenjohannes et al. |
| 2016/0341180 | A1 | 11/2016 | Lee |

FOREIGN PATENT DOCUMENTS

| | | |
|---|---|---|
| EP | 3 073 108 A1 | 9/2016 |
| WO | WO2007/011862 A2 | 1/2007 |
| WO | WO2010/005289 A2 | 1/2010 |
| WO | WO2010/061255 A2 | 6/2010 |
| WO | WO2012/110173 A2 | 8/2012 |
| WO | WO2017/035325 A1 | 3/2017 |

OTHER PUBLICATIONS

Extended European Search Report and Opinion issued in connection with corresponding EP Application No. 18176306.1 dated Oct. 11, 2018.

* cited by examiner

SYSTEM AND METHOD FOR REDUCING WIND TURBINE NOISE DURING HIGH WIND SPEED CONDITIONS

FIELD OF THE INVENTION

The present disclosure relates generally to wind turbines, and more particularly to systems and methods for reducing noise of a wind turbine during high wind speed conditions via nacelle position control.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation, the direction of the wind which powers the wind turbine may change. The wind turbine may thus adjust the nacelle through, for example, a yaw adjustment about a longitudinal axis of the tower to maintain alignment with the wind direction. In addition, wind turbines typically use pitch control to maintain rated power in high winds. As wind speeds increase, the blades are "pitched to feather" (i.e. the pitch angle of the rotor blades is increased) to reduce lift and thrust and maintain torque and power of the wind turbine. When the rotor blades pitch excessively in high winds, aerodynamic blade noise can be increased as well, as a result of thickened boundary layers or separated flow on the pressure side surfaces of the rotor blades.

Accordingly, it would be advantageous to limit excessive pitching and avoid an undesired associated noise increase. As such, the present disclosure is directed to systems and methods which actively yaw the nacelle of the wind turbine away from the nominal wind direction at high wind speeds. With the turbine yawed out of the wind, there is less available power and the blades will not be forced to pitch as excessively to maintain rated power.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for reducing noise of a wind turbine. The method includes determining a wind speed at the wind turbine, e.g. using sensors or an estimator in a turbine controller. The method also includes determining a nominal wind direction for producing rated power of the wind turbine via the turbine controller. Further, the method includes determining a pitch angle of at least one rotor blade of the wind turbine. As such, the method includes determining a yaw offset for a nacelle of the wind turbine based on the wind speed and/or the pitch angle. Thus, the method further includes changing a yaw angle of the nacelle by the yaw offset when at least one of the wind speed or the pitch angle exceeds a predetermined threshold so as to reduce noise of the wind turbine.

In one embodiment, the method may include changing the yaw angle of the nacelle by the yaw offset so as to increase an angle of attack on the rotor blade. Thus, in such embodiments, the increase of the angle of attack reduces noise from a pressure side surface of the rotor blade.

In another embodiment, the step of determining the yaw offset for the nacelle of the wind turbine based on the wind speed and/or the pitch angle may include selecting a predetermined yaw offset from a look-up table when the wind speed exceeds the predetermined threshold. In alternative embodiments, the step of determining the yaw offset for the nacelle of the wind turbine based on the wind speed and/or the pitch angle may include calculating the yaw offset as a function of the wind speed and the pitch angle when the wind speed exceeds the predetermined threshold.

In further embodiments, the method may include incrementally yawing the nacelle away from the nominal wind direction over a range of wind speeds. In other words, the change in the yaw angle may occur gradually. Alternatively, the method may include yawing the nacelle away from the nominal wind direction suddenly, i.e. as soon as the wind speed exceeds the predetermined threshold.

In additional embodiments, the method may include monitoring the wind speed at the wind turbine in real-time. In such embodiments, the sensor(s) may include an accelerometer, a wind vane, a LIDAR sensor, or any other suitable sensor for monitoring wind speed at the wind turbine.

In yet another embodiment, the predetermined threshold may include wind speeds greater than a wind speed at which rated power is reached. In several embodiments, the yaw offset may include angles greater than about sixteen (16) degrees.

In another aspect, the present disclosure is directed to a system for reducing noise of a wind turbine caused by excessive pitching of at least one rotor blade. The system includes at least one sensor configured for monitoring a wind speed at the wind turbine and a controller communicatively coupled to the at least one sensor. The controller includes at least one processor configured to perform one or more operations, including but not limited to determining a nominal wind direction for producing rated power of the wind turbine, determining a yaw offset for a nacelle of the wind turbine based on, at least, the wind speed, and changing a yaw angle of the nacelle by the yaw offset when the wind speed exceeds a predetermined threshold so as to increase an angle of attack on the rotor blade, wherein the increase of the angle of attack reduces noise from a pressure side surface of the rotor blade.

In one embodiment, the one or more operations may include determining a pitch angle of at least one rotor blade of the wind turbine, and determining the yaw offset for the nacelle of the wind turbine based on the wind speed and the pitch angle. It should be further understood that the system may further include any of the additional features as described herein.

In yet another aspect, the present disclosure is directed to a method for reducing noise of a wind turbine. The method includes monitoring, via one or more sensors, a wind speed at the wind turbine. Another step includes determining, via a turbine controller, a nominal wind direction for producing rated power of the wind turbine. The method further includes determining a yaw offset for a nacelle of the wind turbine based on, at least, the wind speed. Moreover, the method includes changing a yaw angle of the nacelle by the yaw offset when the wind speed exceeds a predetermined threshold so as to increase an angle of attack on the rotor blade. Thus, the increase of the angle of attack reduces noise from a pressure side surface of the rotor blade. It should also be understood that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
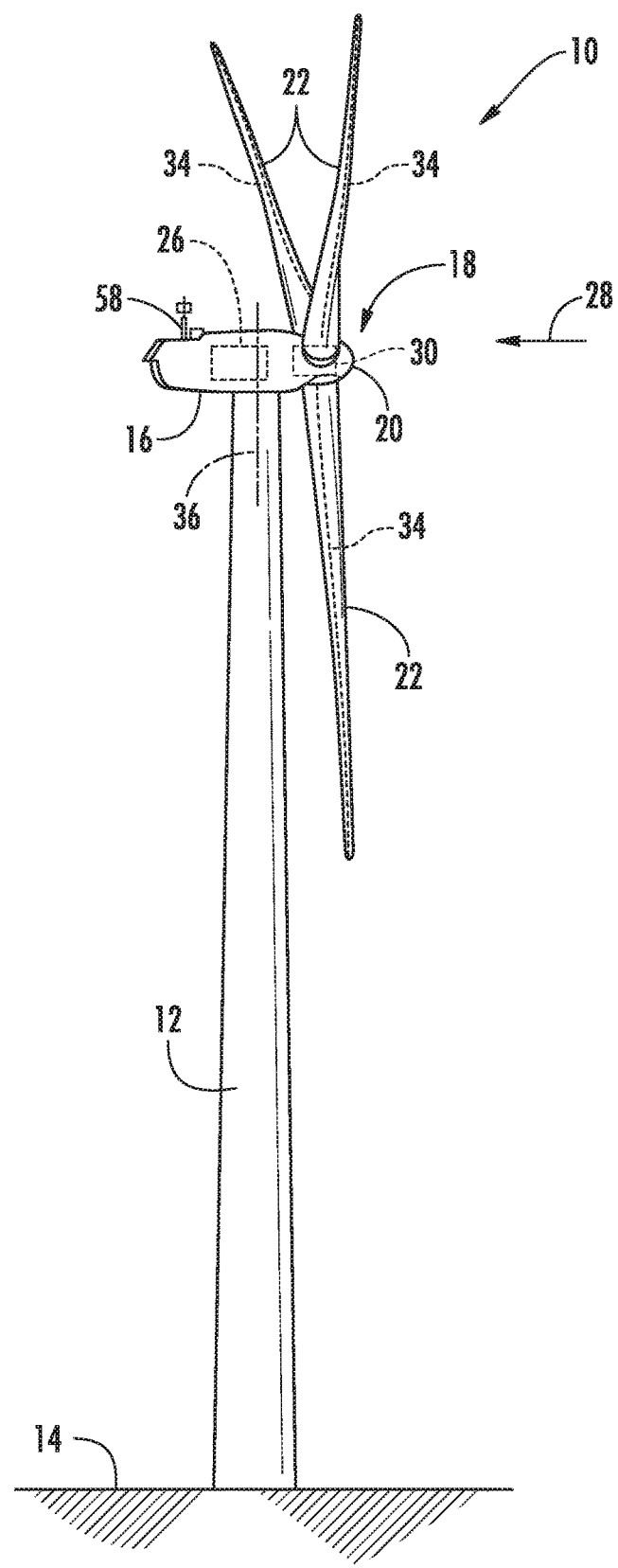
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 4) positioned within the nacelle 16 to permit electrical energy to be produced.

Figure 2:
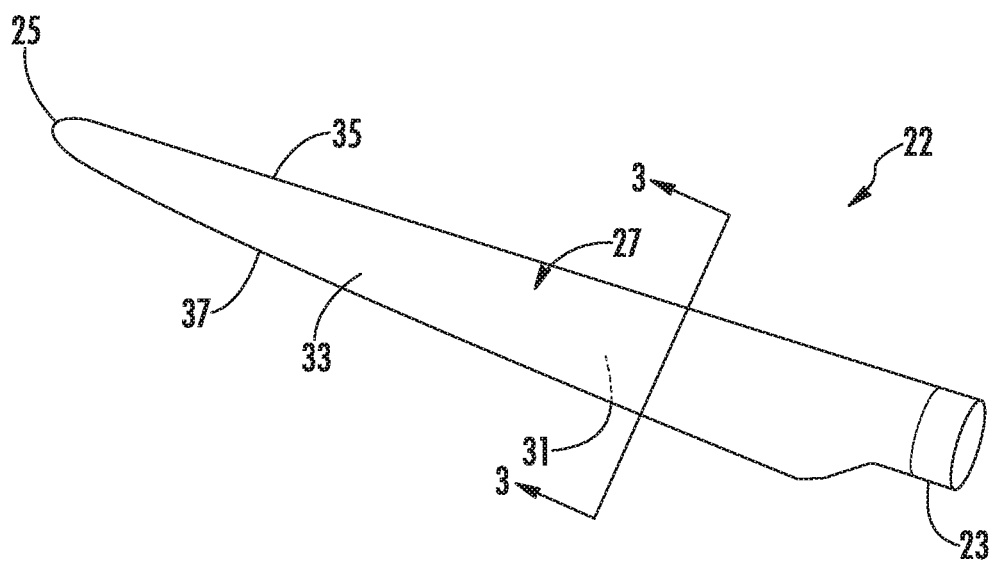
FIG. 2 illustrates a perspective view of one embodiment of one of the rotor blades of the wind turbine shown in FIG. 1.
Figure 3:
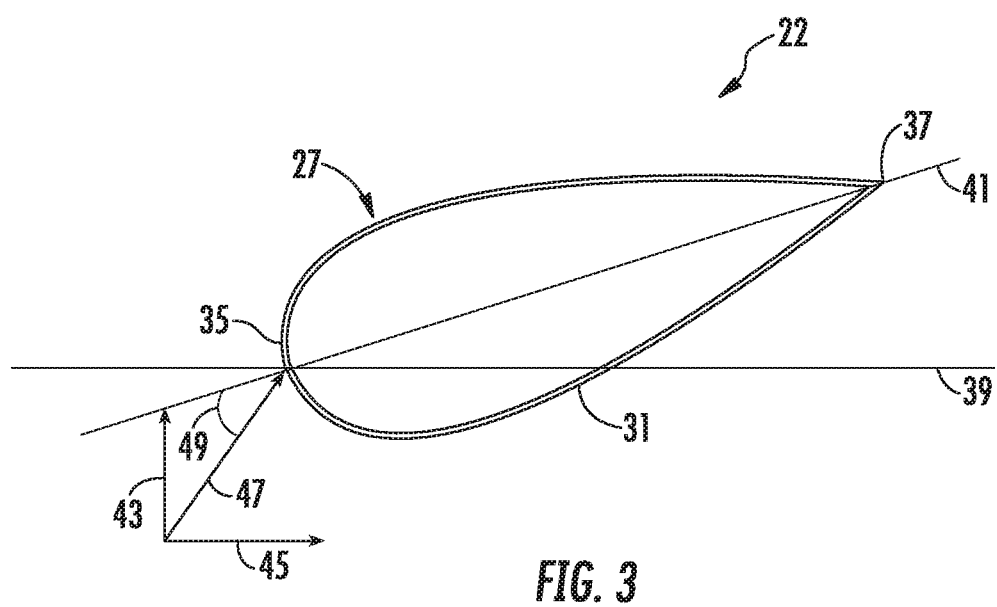
FIG. 3 illustrates a cross-sectional view of the rotor blade shown in FIG. 2 along line 3-3.

Referring now to FIGS. 2 and 3, a perspective view and a cross-sectional view of one of the rotor blades 22 shown in FIG. 1 is illustrated. As shown, the rotor blade 22 generally includes a blade root 24 configured for mounting the rotor blade 22 to the hub 20 of the wind turbine 10 (FIG. 1) and a blade tip 25 disposed opposite the blade root 23. A body 27 of the rotor blade 22 may generally be configured to extend between the blade root 23 and the blade tip 25 and may serve as the outer casing/skin of the blade 22. In several embodiments, as shown particularly in FIG. 3, the body 27 may define a substantially aerodynamic profile, such as by defining a symmetrical or cambered airfoil-shaped cross-section. As such, the body 27 may include a pressure side 31 and a suction side 33 extending between a leading edge 35 and a trailing edge 37.

Figure 4:
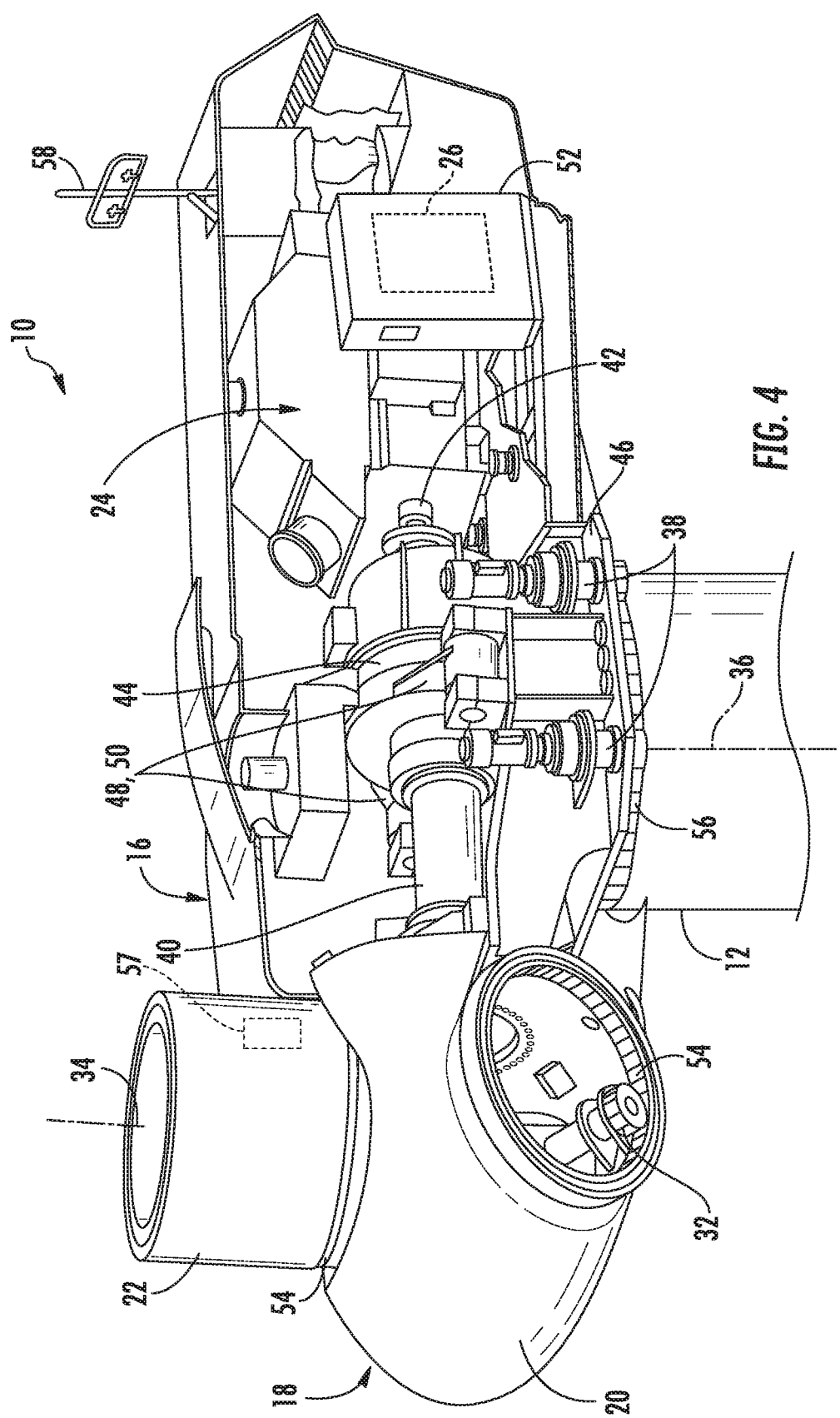
FIG. 4 illustrates a perspective, internal view of one embodiment of a nacelle of a wind turbine according to the present disclosure.

Referring now to FIG. 4, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40.

It should be appreciated that the main shaft 40 may generally be supported within the nacelle 16 by a support frame or bedplate 46 positioned atop the wind turbine tower 12. For example, the main shaft 40 may be supported by the bedplate 46 via a pair of pillow blocks 48, 50 mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shutdown sequences) and/or components of the wind turbine 10.

Further, the turbine controller 26 may also be communicatively coupled to various components of the wind turbine 10 for generally controlling the wind turbine 10 and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Further, as the direction 28 of the wind changes, the turbine controller 26 may be configured to control a yaw angle of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10, via a yaw controller or direct transmission, such that the nacelle 16 may be rotated about the yaw axis 36 via a yaw bearing 56.

Similarly, the turbine controller 26 may also be communicatively coupled to each pitch adjustment mechanism 32 of the wind turbine 10 (one of which is shown) through the pitch controller 30 for controlling and/or altering the pitch angle of the rotor blades 22 (i.e., an angle that determines a perspective of the rotor blades 22 with respect to the direction 28 of the wind). For instance, the turbine controller 26 and/or the pitch controller 30 may be configured to transmit a control signal/command to each pitch adjustment mechanism 32 such that one or more actuators (not shown) of the pitch adjustment mechanism 32 may be utilized to adjust the pitch angle of the rotor blades 22 by rotating the blades 22 along their pitch axes 34 via a pitch bearing 54. The turbine controller 26 may control the pitch angle of the rotor blades 22, either individually or simultaneously, by transmitting suitable control signals/commands to a pitch controller of the wind turbine 10, which may be configured to control the operation of a plurality of pitch drives or pitch adjustment mechanisms 32 (FIG. 2) of the wind turbine, or by directly controlling the operation of the plurality of pitch drives or pitch adjustment mechanisms.

Figure 5:
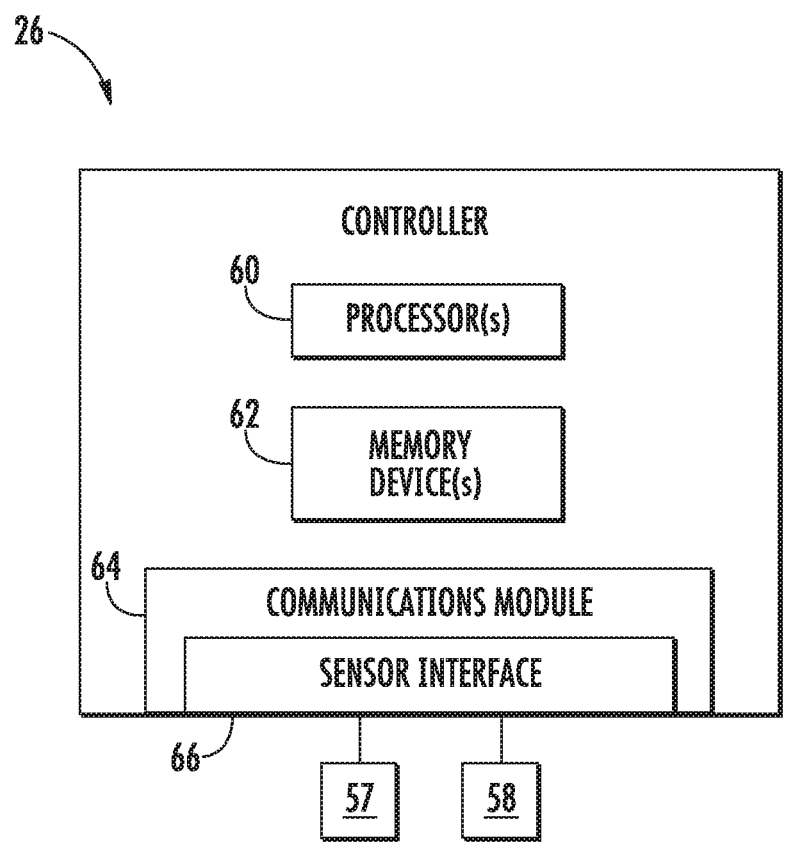
FIG. 5 illustrates a schematic diagram of one embodiment of suitable components that may be included in a wind turbine controller according to the present disclosure.

In addition, as shown in FIGS. 4 and 5, one or more sensors 57, 58 may be provided on the wind turbine 10 for monitoring one or more conditions thereof. More specifically, as shown, the sensor(s) 57, 58 may be mounted at any suitable location for monitoring, e.g. a wind condition at or near the wind turbine 10. For example, the illustrated wind turbine 10 includes a sensor 57 mounted to one or more of the rotor blades 22 and a wind sensor 58 mounted to the nacelle 16 of the wind turbine 10. As such, the wind sensor 58, which may for example be a wind vane, an anemometer, a LIDAR sensor, and/or another suitable sensor, may measure wind speed and/or wind direction. In addition, such sensor(s) 57, 58 may be configured to monitor the wind conditions in real-time. Further, the sensors 57, 58 may be in communication with the controller 26, and may provide related information to the controller 26. For example, yawing of the wind turbine 10 may occur due to sensing of changes in the wind speed and/or wind direction 28.

It should also be appreciated that, as used herein, the term "monitor" and variations thereof indicates that the various sensors of the wind turbine 10 may be configured to provide a direct measurement of the parameters being monitored or an indirect measurement of such parameters. Thus, the sensors described herein may, for example, be used to generate signals relating to the parameter being monitored, which can then be utilized by the controller 26 to determine the condition. In addition, the controller 26 may be configured to determine an average wind speed based on a certain defined time period, e.g. 5 seconds, 10 seconds, 30 seconds, or any other suitable time period. Further, the controller 26 may similarly determine an average pitch angle based on a certain time period. Such values may also be filtered before the average is determined.

Referring now to FIG. 5, there is illustrated a block diagram of one embodiment of suitable components that may be included within the controller 26 according to the present disclosure. As shown, the controller 26 may include one or more processor(s) 60 and associated memory device(s) 62 configured to perform a variety of computer-implemented functions (e.g., performing the methods, steps, calculations and the like and storing relevant data as disclosed herein). Additionally, the controller 26 may also include a communications module 64 to facilitate communications between the controller 26 and the various components of the wind turbine 10. Further, the communications module 64 may include a sensor interface 66 (e.g., one or more analog-to-digital converters) to permit signals transmitted from the sensor(s) 57, 58 to be converted into signals that can be understood and processed by the processors 60. It should be appreciated that the sensor(s) 57, 58 may be communicatively coupled to the communications module 64 using any suitable means. For example, as shown in FIG. 5, the sensor(s) 57, 58 are coupled to the sensor interface 66 via a wired connection. However, in other embodiments, the sensor(s) 57, 58 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement corrective action(s) in response to a distance signal exceeding a predetermined threshold as described herein, as well as various other suitable computer-implemented functions.

As discussed above, a wind turbine 10, such as the nacelle 16 thereof, may rotate about the yaw axis 36 as required. In particular, rotation about the yaw axis 36 may occur due to changes in the wind speed and/or wind direction 28, such that the rotor 18 is aligned with the nominal wind direction 28 (i.e. the wind direction 28 that allows the wind turbine 10 to operate at rated power). In some instances, however, the wind turbine 10 may actively yaw away from the nominal wind direction 28 to decrease pitch, thereby reducing noise associated with excessive blade pitching, e.g. during high winds. More specifically, in certain embodiments, the nacelle 16 may be actively yawed in a direction opposite of the pitch. For example, in one embodiment, if the rotor blades 22 are rotated counterclockwise, when viewed from an upwind position, then the nacelle 16 is rotated counterclockwise, when viewed from above, and if the rotor blades 22 are rotated clockwise, when viewed from an upwind position, then the nacelle 16 is rotated clockwise, when viewed from above. Thus, in such situations, the turbine controller 26 is configured to implement a control strategy when the wind speed and/or the pitch angle increases above a predetermined threshold so as to reduce noise of the wind turbine 10.

Figure 6:
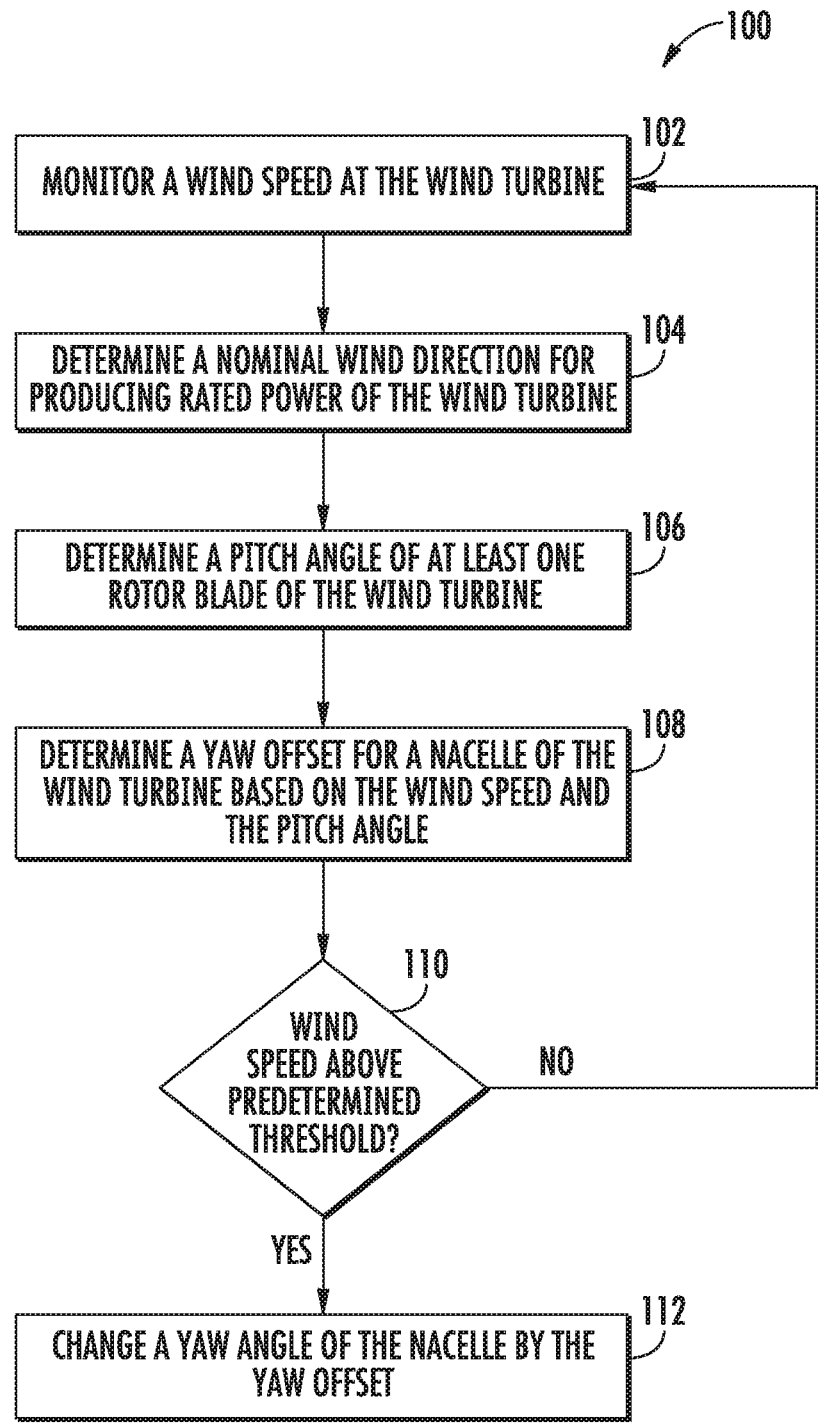
FIG. 6 illustrates a flow diagram of one embodiment of a method for reducing noise of a wind turbine according to the present disclosure.

More specifically, as shown in FIG. 6, a flow diagram of one embodiment of a method 100 for reducing noise of the wind turbine 10 is illustrated. As shown at 102, the method 100 includes monitoring a wind speed at the wind turbine 10. For example, in certain embodiments, the wind speed may be monitored via one or more of the sensors 57, 58. As shown at 104, the controller 26 is further configured to determine a nominal wind direction for producing rated power of the wind turbine 10. As the wind speed rises above the cut-in speed, the level of electrical output power rises rapidly. However, typically somewhere between 12 and 17 meters per second, the power output reaches the limit that the electrical generator is capable of. This limit to the generator output is the rated power output. The wind speed at which the rated power is reached is the rated wind speed. Similarly, the wind direction at which the rated power is reached is the nominal wind direction. At higher wind speeds, the design of the wind turbine 10 is configured to limit the power to the rated power.

Referring still to FIG. 6, as shown at 106, the method 100 includes determining a pitch angle of at least one rotor blade 22 of the wind turbine 10. As shown at 108, the method 100 includes determining a yaw offset for the nacelle 16 of the wind turbine 10 based on the wind speed and/or the pitch angle. As used herein, the yaw offset generally refers to the angular difference between the nacelle orientation and the wind direction 28. As shown at 110, the method 100 is configured to determine whether the wind speed exceeds a predetermined threshold. If the wind speed exceeds the predetermined threshold, as shown at 112, the method 100 includes changing a yaw angle of the nacelle 16 by the yaw offset so as to reduce noise of the wind turbine 10. As such, the turbine controller 26 is configured to actively yaw the nacelle 16 of the wind turbine 10 away from the nominal wind direction at high wind speeds to reduce noise created thereby.

In one embodiment, changing the yaw angle of the nacelle 16 by the yaw offset is configured to increase an angle of attack 49 (FIG. 3) on the rotor blade 22. For example, as shown in FIG. 3, non-limiting example of a snapshot of a cross-section of the rotor blade 22 rotating in a rotor plane 39 in the presence of wind 43 that is useful in understanding some technical features of the disclosed embodiments of the invention. Further, as shown, the view is along the length of the blade 22 radially outwardly from the hub 20. In other words, it is useful to consider the perspective of a viewer in the middle of the hub 20 looking radially outwardly, with the viewer's feet toward the source of the wind 43; in other words the viewer is oriented along the wind 43 direction depicted in FIG. 3 with the viewer's head at the tip of the arrow that represents the wind 43 and indicates its direction. As the viewer remains fixed, gazing outwardly in any direction, each blade passes by the viewer's field of view from right to left.

Due to the rotation of the rotor blade 22 in the rotor plane 39, a second component 45 of air flow is present (i.e. directed opposite to the movement of the section of the rotor blade 22), so that the apparent wind 47 is the vector sum of the wind 43 and the second component 45 of air flow. The apparent wind 47 direction relative to the chord line 41 of the blade 22 determines the angle of attack 49. As such, it follows that for a given chord line 41 geometry (e.g. for a given pitch) and constant rotational rate (and constant magnitude of the second component 45 of air flow), that the greater the wind 43 speed, the greater the angle of attack 49. This can be understood by considering what happens to the apparent wind 47 vector depicted in FIG. 3 as the wind 43 speed increases: the wind 43 vector lengthens vertically in FIG. 3, such that when added to the second component 45 of air flow, the angle of attack 49 increases.

In addition, the predetermined threshold may include wind speeds greater than a wind speed at which rated power occurs. In other words, the predetermined threshold may be any suitable wind speed that allows the wind turbine 10 to operate at rated power. Furthermore, if blade pitch is used to define a predetermined threshold, then this threshold may be any suitable pitch angle above the minimum pitch setting of the wind turbine 10.

Figure 7:
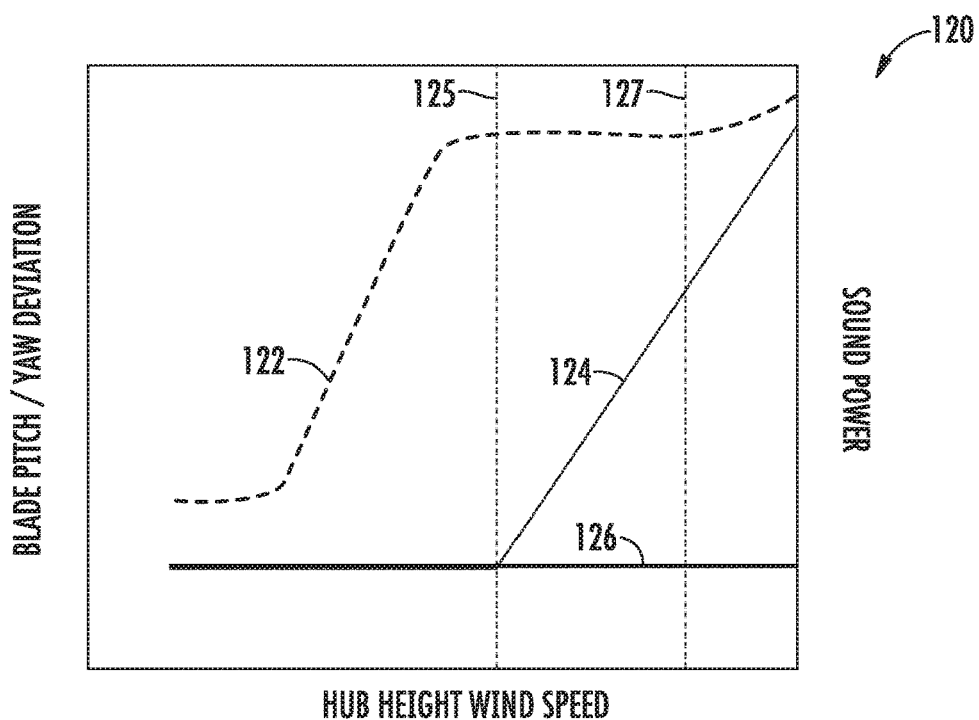
FIG. 7 illustrates a graph of pitch angle/yaw offset and sound power (y-axes) versus hub height wind speed (x-axis) for conventional operation.
Figure 8:
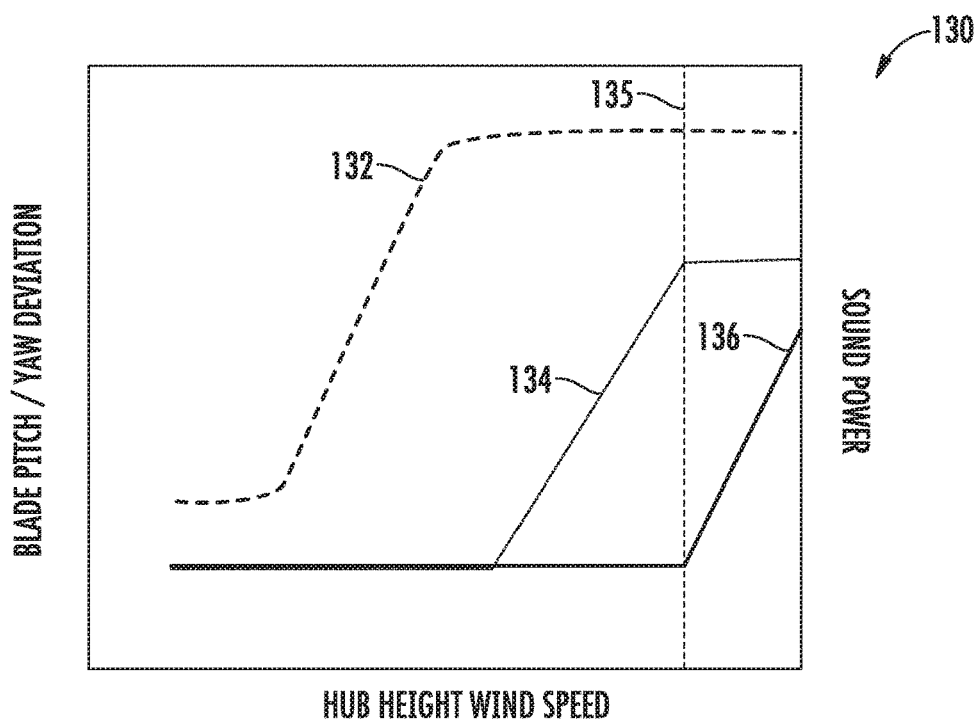
FIG. 8 illustrates a graph of one embodiment of pitch angle/yaw offset and sound power (y-axes) versus hub height wind speed (x-axis) according to the present disclosure.

Referring now to FIGS. 7 and 8, various graphs 120, 130 are provided to illustrate several benefits of the present disclosure. FIG. 7 illustrates a graph 120 of pitch angle/yaw offset and sound power (y-axes) versus hub height wind speed (x-axis) for conventional operation, whereas FIG. 8 illustrates a graph 130 of pitch angle/yaw offset and sound power (y-axes) versus hub height wind speed (x-axis) for the present disclosure. As shown in FIG. 7, the yaw offset 126 is zero since the rotor 18 of the nacelle 16 is pointed directly into the wind during conventional operation. Further, as shown, sound power 122 initially increases with wind speed and then plateaus or decreases as shown between 125 and 127. However, when wind speeds or pitch angles 124 exceed a certain threshold (e.g. as shown at 127), the pressure-side boundary layer of the rotor blade 22 thickens and/or flow separation can occur, which causes another increase in the sound power 122.

Accordingly, FIG. 8 illustrates one example of operation of wind turbine 10 according to the present disclosure. As shown, the yaw offset 136 is changed as a function of the wind speed, such that pitch angle 134 and the sound power 132 remain constant. In other words, if the wind speed is above the predetermined threshold and increases, then the yaw offset increases. Similarly, if the wind speed is above the predetermined threshold and decreases, then the yaw offset decreases. More specifically, as shown at 135, when the wind speed exceeds the predetermined threshold, the controller 26 of the present disclosure increases (or decreases) the yaw offset 136 so as to reduce or maintain (i.e. not increase) the sound power 132 of the wind turbine 10. In several embodiments, the yaw offset 136 may include any suitable angle, such as, e.g. 5 degrees, 10 degrees, 15 degrees, or 30 degrees. For example, in one embodiment, the yaw offset 136 may include angles greater than about sixteen (16) degrees. Alternatively, the yaw offset 136 may include angles less than 16 degrees. In addition, it should be understood that the term offset generally refers to an absolute value of an angle and can therefore include both positive and negative directions.

Figure 9:
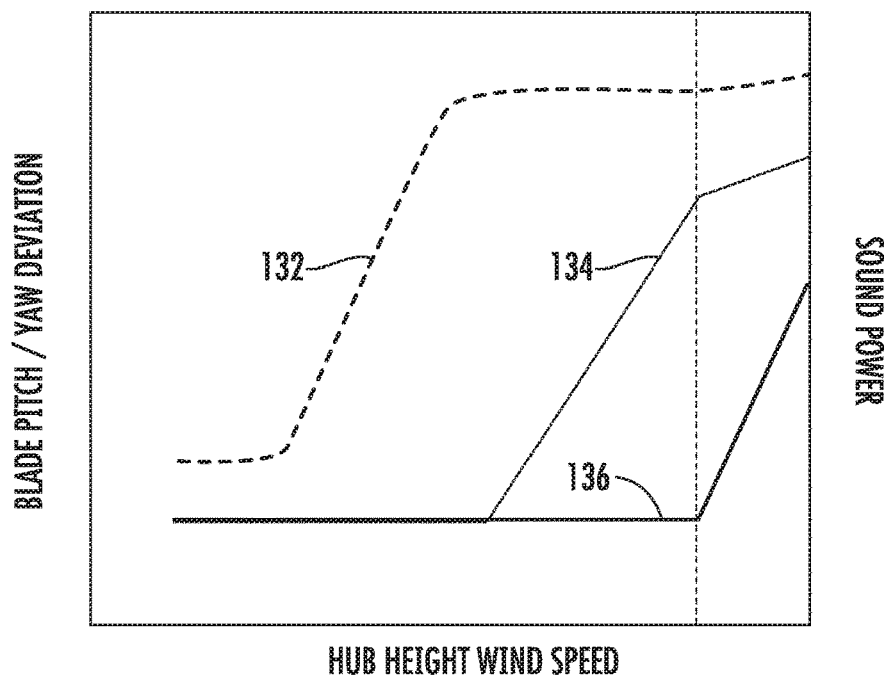
FIG. 9 illustrates a graph of another embodiment of pitch angle/yaw offset and sound power (y-axes) versus hub height wind speed (x-axis) according to the present disclosure.
Figure 10:
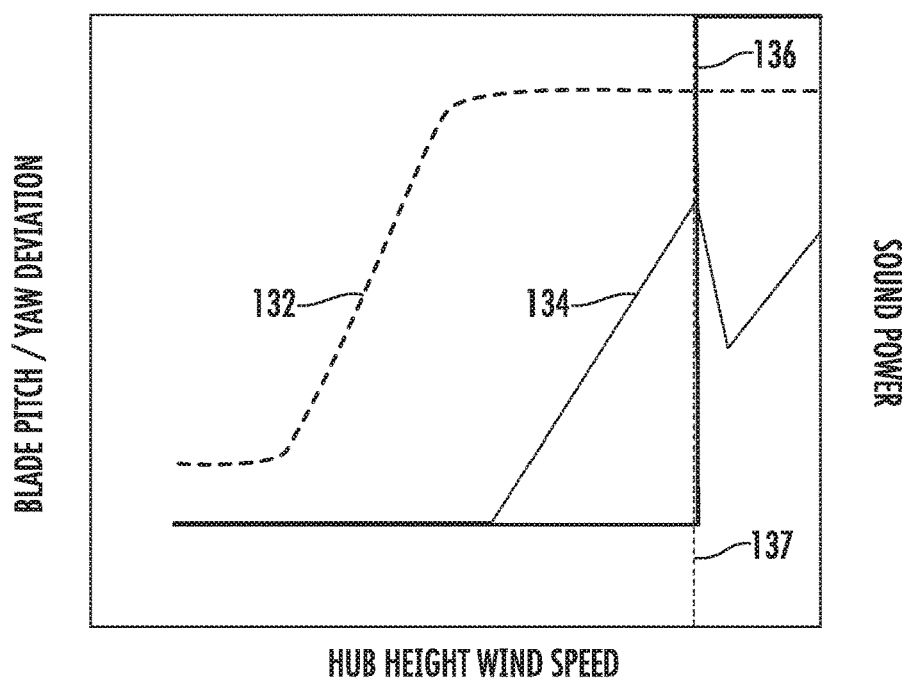
FIG. 10 illustrates a graph of yet another embodiment of pitch angle/yaw offset and sound power (y-axes) versus hub height wind speed (x-axis) according to the present disclosure.

Referring now to FIGS. 9 and 10, further graphs of additional embodiments of the present disclosure are provided to illustrate further benefits thereof. More specifically, as shown in FIG. 9, in certain instances, the yaw offset 136 may not be able to be changed sufficiently to maintain constant blade pitch. In this instance, the controller 26 is configured to pitch the rotor blades 22 above a certain wind speed, but at a reduced rate relative to conventional operation. Thus, as shown, such an operation provides a reduction in sound power 132 as compared to conventional operation (FIG. 7). In addition, as shown in FIG. 10, the controller 26 may increase the yaw offset 136 (or similarly decrease) at a particular wind speed 137, such that pitch angle 134 and the sound power 132 are reduced.

It should be understood that the change in the yaw offset 136 may be defined in any number of ways, such as linear, polynomial, or comprised of a series of steps. For example, in one embodiment, the yaw offset 136 may be a predetermined yaw offset selected from a look-up table when the wind speed exceeds the predetermined threshold. In alternative embodiments, the turbine controller 26 may be configured to calculate the yaw offset 136 as a function of the wind speed and/or the pitch angle when the wind speed exceeds the predetermined threshold.

In further embodiments, the turbine controller 26 may be configured to incrementally yaw the nacelle 16 away from the nominal wind direction 28 over a range of wind speeds. In other words, the change in the yaw angle may occur gradually. Alternatively, the turbine controller 26 may be configured to yaw the nacelle 16 away from the nominal wind direction 28 suddenly, i.e. in response to the wind speed exceeding the predetermined threshold.

Figure 11:
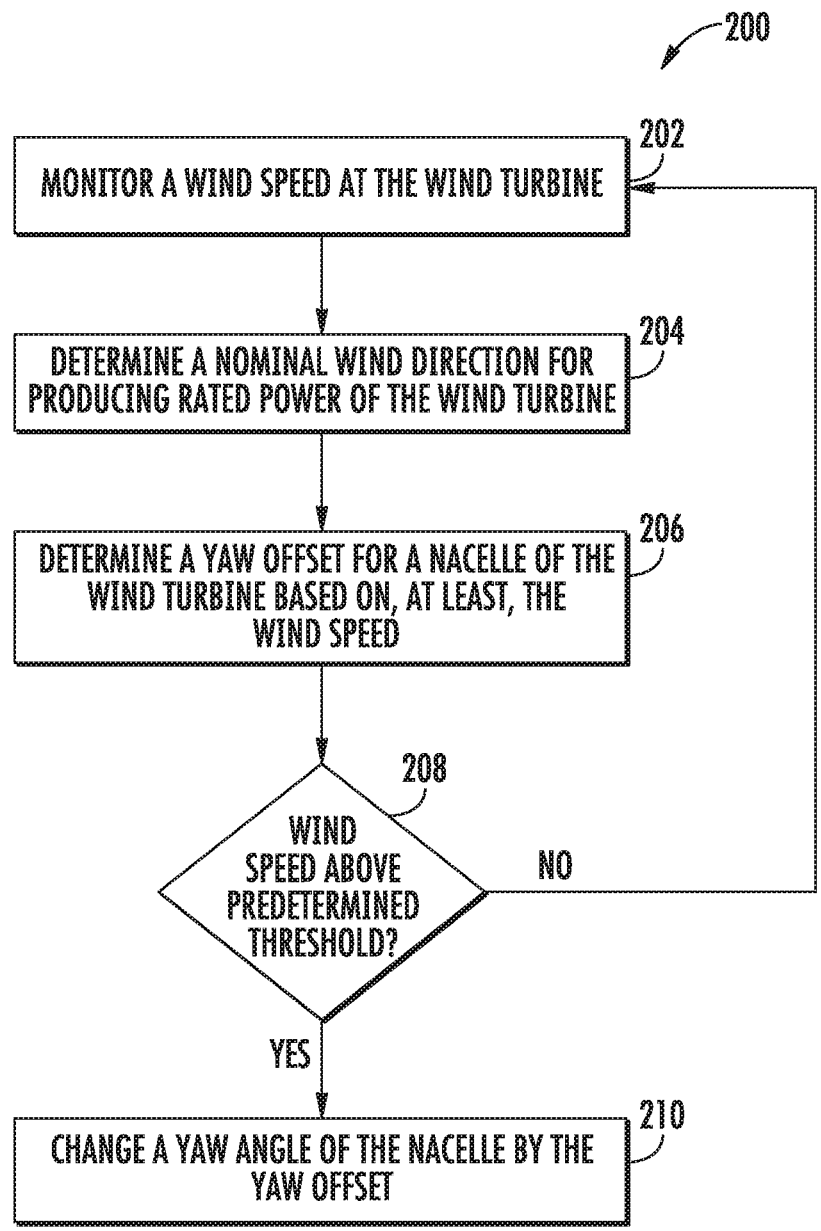
FIG. 11 illustrates a flow diagram of one embodiment of a method for reducing noise of a wind turbine according to the present disclosure.

Referring now to FIG. 11, a flow diagram of one embodiment of a method 200 for reducing noise of a wind turbine, e.g. the wind turbine 10 of FIG. 1, is illustrated. As shown at 202, the method 200 includes monitoring a wind speed at or near the wind turbine 10, e.g. via one or more sensors 57, 58. As shown at 204, the method 200 includes determining a nominal wind direction for producing rated power of the wind turbine 10. As shown at 206, the method 200 includes determining a yaw offset for a nacelle of the wind turbine 10 based on, at least, the wind speed. As shown at 208, the method 200 includes determining whether the wind speed exceeds a predetermined threshold. If the wind speed exceeds a predetermined threshold, as shown at 210, the method 200 includes changing a yaw angle of the nacelle 16 by the yaw offset so as to increase an angle of attack on the rotor blade 22. Thus, the increase of the angle of attack reduces noise from a pressure side surface of the rotor blade 22.

In such embodiments, the method 200 may further include determining a pitch angle of at least one rotor blade 22 of the wind turbine 10 and determining the yaw offset for the nacelle 16 of the wind turbine 10 based on the wind speed and/or the pitch angle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing noise of a wind turbine, the method comprising:
   determining a wind speed at the wind turbine;
   determining, via a turbine controller, a nominal wind direction for producing rated power of the wind turbine;
   determining at least one pitch angle of at least one rotor blade of the wind turbine and an amount of pitching during operation of the wind turbine;
   determining a yaw offset for a nacelle of the wind turbine based on the wind speed the pitch angle, and the amount of pitching; and,
   changing a yaw angle of the nacelle by the yaw offset when the wind speed, the pitch angle, and the amount of pitching exceed respective thresholds for the wind speed, the pitch angle and the amount of pitching, respectively, so as to reduce noise of the wind turbine.

2. The method of claim 1, further comprising changing the yaw angle of the nacelle by the yaw offset so as to increase an angle of attack on the rotor blade, wherein the increase of the angle of attack reduces noise from a pressure side surface of the rotor blade.

3. The method of claim 1, wherein determining the yaw offset for the nacelle of the wind turbine based on the wind speed, the pitch angle, and the amount of pitching further comprises selecting a predetermined yaw offset from a look-up table.

4. The method of claim 1, wherein determining the yaw offset for the nacelle of the wind turbine based on the wind speed, the pitch angle, and the amount of pitching further comprises calculating the yaw offset as a function of the wind speed, the pitch angle and the amount of pitching.

5. The method of claim 1, further comprising incrementally yawing the nacelle away from the nominal wind direction over a range of wind speeds.

6. The method of claim 1, further comprising monitoring the wind speed at the wind turbine in real-time via one or more sensors.

7. The method of claim 6, wherein the one or more sensors comprise at least one of an accelerometer, a wind vane, an anemometer, or a LIDAR sensor.

8. The method of claim 1, wherein the predetermined threshold for the wind speed comprises at least one of wind speeds greater than a wind speed at which the rated power is reached or pitch angles greater than a minimum pitch setting of the wind turbine.

9. The method of claim 1, wherein the yaw offset comprises angles greater than sixteen (16) degrees.

10. A system for reducing noise of a wind turbine caused by excessive pitching of at least one rotor blade, the system comprising:
    at least one sensor configured for monitoring a wind speed at the wind turbine and an amount of pitching of the at least one rotor blade during operation of the wind turbine;
    a controller communicatively coupled to the at least one sensor, the controller comprising at least one processor configured to perform one or more operations, the one or more operations comprising:
    determining a nominal wind direction for producing rated power of the wind turbine;
    determining a yaw offset for a nacelle of the wind turbine based on, at least, the wind speed and the amount of pitching; and,
    changing a yaw angle of the nacelle by the yaw offset when the wind speed and the amount of pitching exceed respective thresholds so as to increase an angle of attack on the rotor blade, wherein the increase of the angle of attack reduces noise from a pressure side surface of the rotor blade.

11. The system of claim 10, wherein the one or more operations further comprise:

determining a pitch angle of at least one rotor blade of the wind turbine; and, determining the yaw offset for the nacelle of the wind turbine based on the wind speed, the amount of pitching, and the pitch angle.

12. The system of claim 10, wherein determining the yaw offset for the nacelle of the wind turbine further comprises selecting a predetermined yaw offset from a look-up table.

13. The system of claim 10, wherein determining the yaw offset for the nacelle of the wind turbine further comprises calculating the yaw offset as a function of the wind speed and the pitch angle.

14. The system of claim 10, further comprising incrementally yawing the nacelle away from the nominal wind direction over a range of wind speeds.

15. The system of claim 10, further comprising monitoring the wind speed at the wind turbine in real-time.

16. The system of claim 10, wherein the one or more sensors comprise at least one of an accelerometer, a wind vane, an anemometer, or a LIDAR sensor.

17. The system of claim 10, wherein the threshold for the wind speed comprises wind speeds greater than a wind speed at which the rated power is reached.

18. The system of claim 10, wherein the yaw offset comprises angles greater than sixteen (16) degrees.

19. A method for reducing noise of a wind turbine, the method comprising:

monitoring, via one or more sensors, a wind speed at the wind turbine and an amount of pitching of at least one rotor blade of the wind turbine;

determining, via a turbine controller, a nominal wind direction for producing rated power of the wind turbine;

determining a yaw offset for a nacelle of the wind turbine based on, at least, the wind speed and the amount of pitching; and, changing a yaw angle of the nacelle by the yaw offset when the wind speed and the amount of pitching exceed respective thresholds so as to increase an angle of attack on the rotor blade, wherein the increase of the angle of attack reduces noise from a pressure side surface of the rotor blade.

20. The method of claim 19, further comprising:

determining a pitch angle of at least one rotor blade of the wind turbine; and, determining the yaw offset for the nacelle of the wind turbine based on the wind speed, the amount of pitching, and the pitch angle.

* * * * *